United States Patent
Kim et al.

(10) Patent No.: US 8,443,417 B2
(45) Date of Patent: May 14, 2013

(54) NODE AUTHENTICATION AND NODE OPERATION METHODS WITHIN SERVICE AND ACCESS NETWORKS IN NGN ENVIRONMENT

(75) Inventors: Kwihoon Kim, Daejeon (KR);
Hyun-Woo Lee, Daejeon (KR);
Seng-Kyoun Jo, Seoul (KR); Jae-Young Ahn, Daejeon (KR); Won Ryu, Daejeon (KR); Byung-Sun Lee, Daejeon (KR); Kyung-Pyo Jun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 523 days.

(21) Appl. No.: 12/667,886

(22) PCT Filed: Jul. 4, 2008

(86) PCT No.: PCT/KR2008/003969
§ 371 (c)(1),
(2), (4) Date: Feb. 11, 2010

(87) PCT Pub. No.: WO2009/008641
PCT Pub. Date: Jan. 15, 2009

(65) Prior Publication Data
US 2010/0146610 A1    Jun. 10, 2010

(30) Foreign Application Priority Data

Jul. 6, 2007    (KR) .................. 10-2007-0068080

(51) Int. Cl.
*H04L 9/32* (2006.01)
*H04L 9/00* (2006.01)

(52) U.S. Cl.
USPC .................. 726/2; 726/3; 726/7; 713/168

(58) Field of Classification Search .................. 713/150, 713/160, 161, 168–171; 726/2–7, 10–12
See application file for complete search history.

(56) References Cited

U.S. PATENT DOCUMENTS

| 7,136,635 B1 * | 11/2006 | Bharatia et al. ............ 455/422.1 |
| 2006/0265585 A1 | 11/2006 | Lai |

(Continued)

FOREIGN PATENT DOCUMENTS

| JP | 2009-531921 A | 9/2009 |
| KR | 1020070013773 A | 1/2007 |
| WO | 03/092252 A1 | 11/2003 |
| WO | 2006/006704 A2 | 1/2006 |
| WO | 2007/110743 A2 | 10/2007 |

OTHER PUBLICATIONS

International Search Report: PCT/KR2008/003969.

(Continued)

*Primary Examiner* — Hosuk Song
(74) *Attorney, Agent, or Firm* — Ladas & Parry LLP

(57) ABSTRACT

Provided are node authentication and node operation methods within service and access networks for bundle authentication between the service and access networks in a next generation network (NGN). A method of authentication processing of a node (S-CSC-FE/I-CSC-FE (Serving Call Session Control Functional Entity/Interrogating Call Session Control Functional Entity)) within a service network for bundle authentication between service and access networks, the method including: receiving first authentication information about access authentication of a terminal from a first node within the service networks; requesting to receive second authentication information from a second node within the service network based on the first authentication information; and comparing the first authentication information with the second authentication information to authenticate the terminal.

6 Claims, 3 Drawing Sheets

U.S. PATENT DOCUMENTS

| | | | |
|---|---|---|---|
| 2007/0044146 | A1 | 2/2007 | Murase et al. |
| 2007/0055874 | A1 | 3/2007 | Phan-Anh et al. |
| 2007/0070958 | A1* | 3/2007 | Rinne et al. .................. 370/338 |
| 2007/0143834 | A1 | 6/2007 | Leinonen et al. |

OTHER PUBLICATIONS

ETSI; "Telecommunications and Internet converged Services and Protocols for Advanced Networking (TISPAN); IP Multimedia: Diameter based protocol for the interfaces between the Call Session Control Function and the User Profile Server Function/Subscription Locator Function; Signalling flows and protocol details", ETSI TS 183 033 V1.1.3 [3GPP TS 29.228 V6.8.0 and 3GPP TS 29.229 V6.6.0, modified] Apr. 2007; 4 pages.

Silke Holtmanns, et al; "Access Authentication to IMS Systems in Next Generation Networks", Sixth International Conference on Networking (ICN'07) Sainte-Luce, Martinique, France, Apr. 22-Apr. 28, 2007; 8 pages.

Kwihoon Kim, et al; "Bundled authentication scheme of fixed and mobile terminal between both service and access network in NGN environment", ITC-CSCC International Technical Conference on Circuits Systems, Computers and Communications, Jul. 2007, pp. 1306-1307.

ETSI TS 187 003 v1.1.1 (Mar. 2006) Telecommunications and Internet Converged Services and Protocols for Advanced Networking (TISPAN); NGN Security; Security Architecture; 11 pages.

ETSI ES 282 004 v1.1.1 (Jun. 2006); Telecommunications and Internet Converged Services and Protocols for Advanced Networking (TISPAN); NGN Functional Architecture Sub-System (NASS); 4 pages.

Kwihoon Kim, et al; "Design of Unified Authentication for Multi-mode Terminal between Service and Access Network in NGN", $10^{th}$ International Conference on Advanced Communication Technology, 2008, ICACT 2008; Feb. 17-20, 2008; vol. 2, pp. 1288-1292.

ETSI TS 133 203 v7.6.0 (Jun. 2007); Digital Cellular Telecommunications System (Phase 2+); Universal Mobile Telecommunications System (UMTS); 3G Security; Access Security for IP-based services (3GPP TS 33.203 version 7.6.0 Release 7); 5 pages.

ETSI TR 133 978 v6.6.0 (Dec. 2006) Universal Mobile Telecommunications System (UMTS); Security Aspects of early IP Multimedia Subsystem (IMS) (3GPP TR 33.978 version 6.6.0 Release 6); 6 pages.

Third International Conference on Networking and Services; ICNS2007; Jun. 19-25, 2007; IPv6DFI 2007: The Second International Workshop on Deploying the Future Infrastructure IPDy 2007: The Second International Workshop on Internet Packet Dynamics, GOBS 2007: The First International Workshop on GRID over Optical Burst Switching Networks; 8 pages.

* cited by examiner

NODE AUTHENTICATION AND NODE OPERATION METHODS WITHIN SERVICE AND ACCESS NETWORKS IN NGN ENVIRONMENT

This application claims the benefit of Korean Patent Application No. 10-2007-0068080, filed on Jul. 6, 2007, in the Korean Intellectual Property Office, the disclosure of which is incorporated herein in its entirety by reference.

TECHNICAL FIELD

The present invention relates to node authentication and node operation methods, and more particularly, node authentication and node operation methods within service and access networks for bundle authentication between the service and access networks in a next generation network (NGN) when a subscriber subscribes to the service and access networks.

This work was partly supported by the IT R&D program of MIC/IITA [2005-S-058-02, Development of Network/Service Control Technology in ALL-IP based Converged network].

BACKGROUND ART

It is assumed that an access provider and a service provider share physical line information previously in an NGN environment of conventional ITU-T (International Telecommunication Union-Telecommunication Standardization Sector) and TISPAN (The Telecoms & Internet converged Services & Protocols for Advanced Networks). In this case, when a subscriber has access to an access network and network connection authentication succeeds, a subscriber having the same line information is authenticated in a service network without a special authentication key exchange mechanism.

Currently, in documents of ITU-T and TISPAN, SCF (Service Control Function) which takes charge in control, registration, authentication, and authorization of session at a service level needs NACFs (Network Attachment Control Functions) which provides an identification/authentication function of a network level to subscribers who try to access to an NGN service for registration function, to retrieve line information using an IP (Internet Protocol) address as a key in order to obtain physical line information. In normal cases, various NACFs exist in one SCF. However, there is no special mention on which NACF the SCF selects.

According to conventional SCF-NACF bundle authentication, when access authentication that is managed by a specific NACF only for fixed subscribers, succeeds and when a terminal requests a service user ID (Identifier), i.e., PUID (PUblic user ID) or PRID (PRivate user ID), subscribed to SCF-NACF bundle authentication, using an IP address and a realm in which access authentication succeed, service authentication also succeeds. This is because of the following four conditions.

When access authentication succeeds, one IP address and one realm are allocated to a subscriber ID that succeeds access network connection for each line ID. P-CSC-FE (Proxy Call Session Control Functional Entity) obtains an IP and a realm which are a service user ID, from a terminal and obtains a line ID from TLM-FE (Transport Location Management Functional Entity) using the IP and realm. When predetermined SCF and NACF are bundle-subscribed to SUP-FE (Service User Profile Functional Entity), a line ID of the NACF is stored previously for a service user ID (a predetermined line ID is fixed to a fixed subscriber). S-CSC-FE (Service Call Session Control Functional Entity) determines for authentication whether the line ID received from P-CSC-FE and the line ID received from SUP-FE are the same or not.

Furthermore, an NACF-SCF bundle authentication scheme in documents of ITU-T and TISPAN is based on lines and thus can be applied only to a fixed network such as xDSL. Thus, the NACF-SCF bundle authentication scheme cannot be used in WLAN (wireless LAN) or WiBro network in which the terminal is moved.

DISCLOSURE OF INVENTION

Technical Problem

The present invention provides node authentication and node operation methods within service and access networks for SCF-NACF bundle authentication by registering a TLM-FE address of NACF in P-CSC-FE.

Technical Solution

According to an aspect of the present invention, there is provided a method of authentication processing of a node (S-CSC-FE/I-CSC-FE (Serving Call Session Control Functional Entity/Interrogating Call Session Control Functional Entity)) within a service network for bundle authentication between service and access networks, the method including: receiving first authentication information about access authentication of a terminal from a first node within the service networks; requesting to receive second authentication information from a second node within the service network based on the first authentication information; and comparing the first authentication information with the second authentication information to authenticate the terminal.

According to another aspect of the present invention, there is provided a method of operating a node (TAA-FE (Transport Authentication & Authorization Functional Entity)/TUP-FE (Transport User Profile Functional Entity)) within an access network for bundle authentication between service and access networks, the method including: performing access authentication on a terminal that tries to access the access network; determining whether or not the terminal subscribes to a bundle of the service and access networks; and when it is checked that the terminal subscribes to the bundle of the service and access networks, transmitting first and second authentication information to the access network and the service network, respectively.

According to another aspect of the present invention, there is provided a method of operating a node (P-CSC-FE (Proxy Call Session Control Functional Entity)) within a service network for bundle authentication between service and access networks, the method including: receiving authentication information when access authentication is performed on a terminal in the access network; determining whether or not the authentication information corresponding to the terminal exists when the terminal accesses the service network; and when it is determined that the authentication information does not exit, requesting the authentication information to the access network and receiving the authentication information.

Advantageous Effects

According to the present invention, NACF-SCF bundle authentication can be performed regardless of a wired or wireless access in an NGN. The prior art is capable of NACF-SCF bundle authentication only at a wired access. On the other hand, the present invention can be applied to wired or wireless subscribers. Furthermore, by using the present invention, when a subscriber subscribes to NACF-SCF authentication in an NGN, if access authentication in NACF succeeds, an additional authentication procedure is simplified, and due to a simplified service authentication procedure, a service user can omit an operation of additionally inputting a password.

DESCRIPTION OF DRAWINGS

The above and other features and advantages of the present invention will become more apparent by describing in detail exemplary embodiments thereof with reference to the attached drawings in which.

MODE FOR INVENTION

Figure 1:
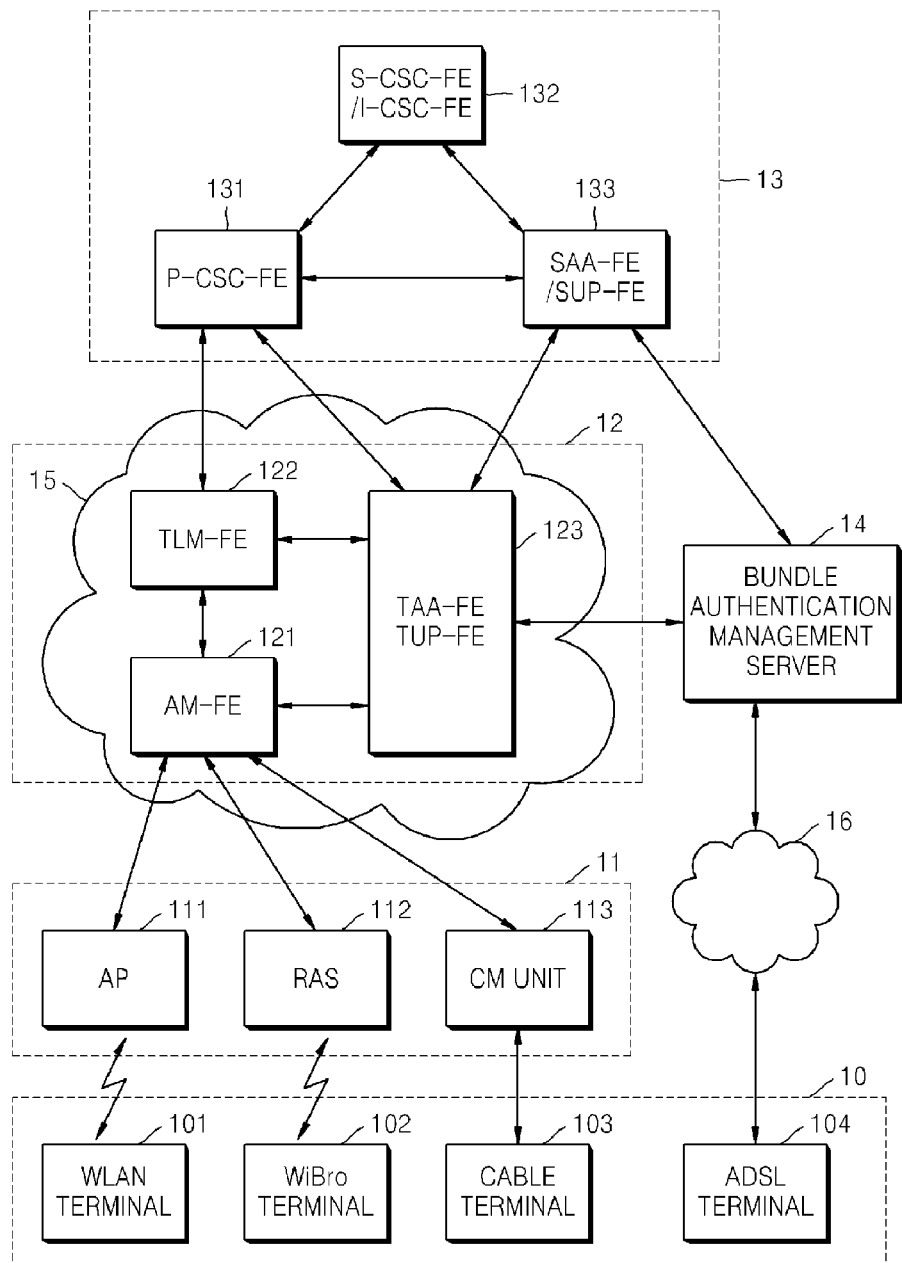
FIG. 1 illustrates a configuration of a system to which embodiments of the present invention are applied.

FIG. 1 illustrates a configuration of a system to which embodiments of the present invention are applied.

Referring to FIG. 1, the system comprises an NGN terminal unit 10, a connection unit 11, an NACF unit 12, and an SCF unit 13. The system may further comprise a bundle authentication server manager 14, if necessary. Reference numerals 15 and 16 denote wired or wireless communication networks. There may be a plurality of wired or wireless communication network 15 and 16 and thus, there may be a plurality of NACF units 12 and SCF units 13.

The NGN terminal unit 10 comprises a WLAN terminal 101, a WiBro terminal 102, a cable terminal 103, and an asymmetric digital subscriber line (ADSL) terminal 104.

The connection unit 11 comprises an access point (AP) 111 connected to the WLAN terminal 101, a remote access server (RAS) 112 connected to the WiBro terminal 102, and a cable modem (CM) unit 113 connected to the cable terminal 103 and comprising a CM and a cable modem termination system (CMTS), which are devices for packet connection of each NGN terminal. The ADSL terminal 104 is connected to the wired or wireless communication network 16 via an ADSL line.

The NACF unit 12 which is an access control network, takes charge in IP address allocation and connection authentication for connection. The NACF unit 12 comprises AM-FE (Access Management Functional Entity) 121 for access management, TLM-FE (Transport Location Management Functional Entity) 122 for transport location management, and TAA-FE (Transport Authentication & Authorization Functional Entity)/TUP-FE (Transport User Profile Functional Entity) 123 for authentication.

The SCF unit 13 which is a service control network, takes charge in service routing and service authentication. The SCF unit 13 comprises P-CSC-FE (Proxy Call Session Control Functional Entity) 131, S-CSC-FE/I-CSC-FE (Serving Call Session Control Functional Entity/Interrogating Call Session Control Functional Entity) 132, SAA-FE (Service Authentication & Authorization Functional Entity)/SUP-FE (Service User Profile Functional Entity) 133.

The bundle authentication management server 14 takes charge in authentication information exchange between the NACF unit 12 and the SCF unit 13 and stores a service user ID corresponding to a subscriber ID when a subscriber subscribes to a bundle.

Figure 2:
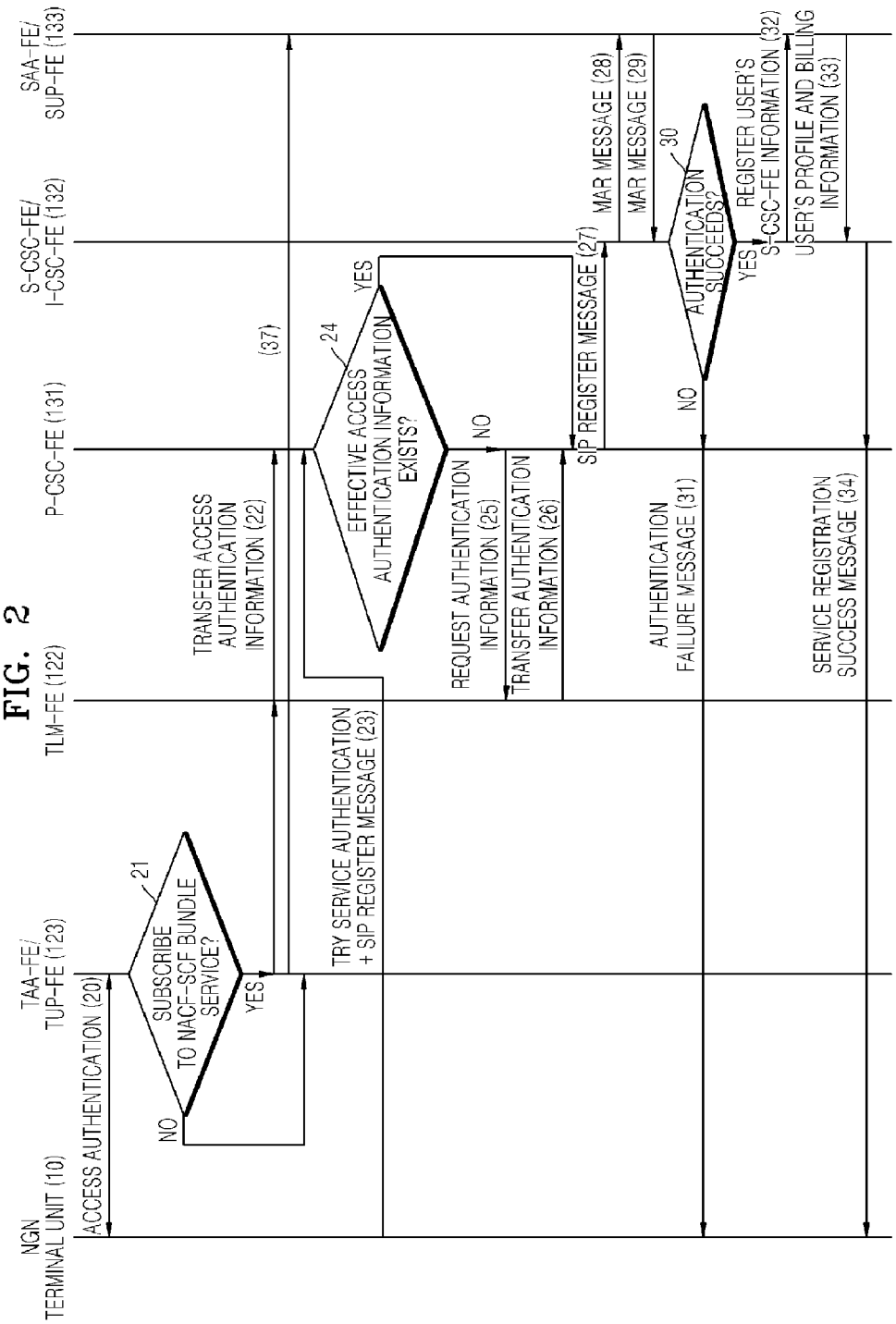
FIG. 2 is a flowchart illustrating a method of bundle authentication of a wired or wireless terminal between service and access networks in a next generation network (NGN) according to an embodiment of the present invention.

FIG. 2 is a flowchart illustrating a method of bundle authentication of a wired or wireless terminal between service and access networks in a next generation network (NGN) according to an embodiment of the present invention.

First, a terminal of the NGN terminal unit 10 is access-authenticated by the TAA-FE/TUP FE 123 through the AM FE 121 (operation 20). If authentication succeeds, the TAA-FE/TUP FE 123 determines whether the corresponding subscriber subscribes to an NACF-SCF bundle service (operation 21) or not. If the subscriber subscribes to the NACF-SCF bundle service, the TAA-FE/TUP FE 123 transfers authentication information to the TLM-FE 122 using a global IP address as a key, and the TLM-FE 122 sends the authentication information and its own address to the P-CSC-FE 131 (operation 22). In addition, the TAA-FE/TUP FE 123 sends the authentication information to the SAA-FE/SUP FE 133 using a subscriber ID as a key (operation 37). Here, the SAA-FE/SUP FE 133 stores a service user ID corresponding to the subscriber ID when the subscriber subscribes to a bundle.

If the subscriber also subscribes to NGN SCF and tries service registration authentication, a subscriber terminal transfers a session initiation protocol (SIP) register message to the P-CSC-FE 131 (operation 23).

The P-CSC-FE 131 inspects whether the service user subscribes to an NACF-SCF bundle (operation 24) or not. The inspection operation is performed by determining whether there is effective access authentication information to be mapped to the global IP address of the terminal or not. If there is no effective access authentication information, the P-CSC-FE 131 requests authentication information to the TLM-FE 122 using an address of the TLM-FE 122 (operation 25) and obtains the authentication information from the TLM-FE 122 (operation 26).

The P-CSC-FE 131 inserts the authentication information to an SIP register message and sends the SIP register message to the S-CSC-FE/I-CSC-FE 132 (operation 27). In this case, the SIP register message comprises PUID and PRID obtained from the subscriber when the subscriber subscribes to the bundle.

The S-CSC-FE/I-CSC-FE 132 sends an MAR (Multimedia Authentication Request) message requesting bundle authentication and authentication information registered in the SAA-FE/SUP-FE 133 to the SAA-FE/SUP-FE 133 using PUID and PRID included in the SIP register message as a key (operation 28) and obtains an MAA (Multimedia Authentication Answer) message including the authentication information (operation 29).

The S-CSC-FE/I-CSC-FE 132 compares to determine whether the authentication information obtained from the TLM-FE 122 and the authentication information obtained from the SAA-FE/SUP-FE 133 are the same or not (operation 30). If two authentication information are not the same, it is determined that authentication fails and failure of the terminal authentication is notified to the terminal of the NGN terminal unit 10 through the P-CSC-FE 131 (operation 31). If the authentication succeeds, the S-CSC-FE/I-CSC-FE 132 registers S-CSC-FE information to which a user terminal belongs, in the SAA-FE/SUP-FE 133 using an SAR (Server Assignment Request) message (operation 32) and receives a profile and billing information of the service user from the SAA-FE-SUP-FE 133 using an SAA (Server Assignment Answer) message (operation 33).

The S-CSC-FE/I-CSC-FE 132 sends a service registration success message for the SIP register to the subscriber terminal through the P-CSC-FE 131 (operation 34).

Figure 3:
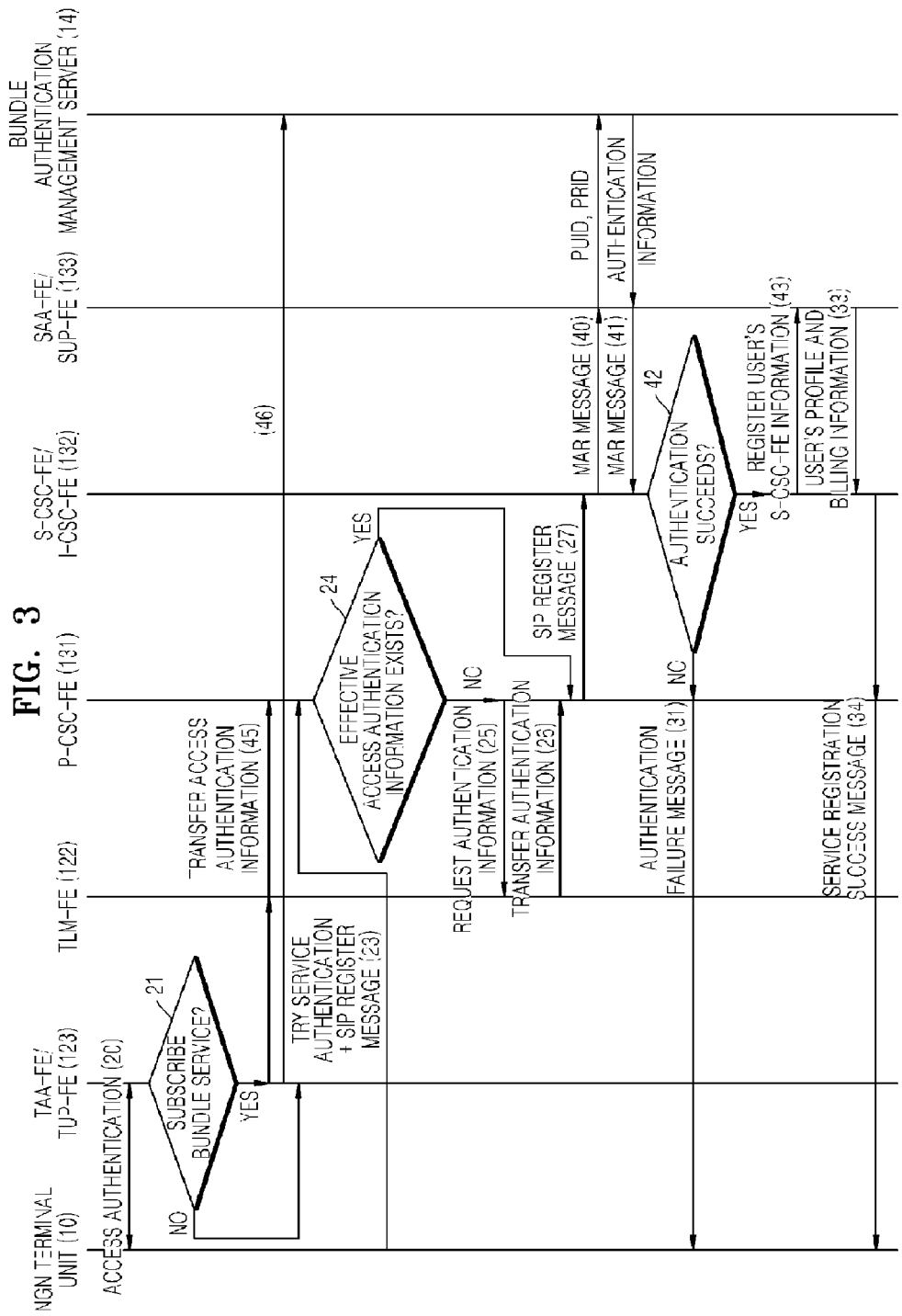
FIG. 3 is a flowchart illustrating a method of bundle authentication of a wired or wireless terminal between service and access networks using a bundle authentication management server in a next generation network (NGN).

FIG. 3 is a flowchart illustrating a method of bundle authentication of a wired or wireless terminal between service and access networks using a bundle authentication management server in a NGN. In FIG. 3, operations having the same reference numerals as those of FIG. 2 are the same as operations of FIG. 2. Thus, a detailed description thereof will be omitted, and only operations having different reference numerals will now be described.

In operation 22 of FIG. 2, the TAA-FE/TUP-FE 123 transfers the authentication information to a bundle authentication management server 14 using a subscriber ID as a key (operation 45). The TAA-FE/TUP FE 123 sends the authentication information to the bundle authentication management server 14 using the subscriber ID as the key (operation 46). Here, the bundle authentication management server 14 stores a service user ID corresponding to the subscriber ID received when a subscriber subscribes to a bundle.

Furthermore, in operation 28 of FIG. 2, if the S-CSC-FE/I-CSC-FE 132 requests a result of whether the bundle authentication is performed and the authentication information to the SAA-FE/SUP-FE 133 using an MAR message, the SAA-FE/SUP-FE 133 transmits PRID or PUID to the bundle authentication management server 14 and requests the authentication information (operation 40). The bundle authentication management server 14 transfers the authentication information for the corresponding subscriber to the SAA-FE/SUP-FE 133, and the SAA-FE/SUP-FE 133 inserts the authentication information to an MAA message and sends the MAA message to the S-CSC-FE/I-CSC-FE 132 (operation 41).

The S-CSC-FE/I-CSC-FE 132 compares to determine whether the authentication information obtained from the TLM-FE 122 and the authentication information obtained from the bundle authentication management server 14 are the same or not (operation 42). If two authentication information are not the same, it is determined that authentication fails and failure of terminal authentication is notified to the terminal of the NGN terminal unit 10 through the P-CSC-FE 131 (operation 31). If the authentication succeeds, the S-CSC-FE/I-CSC-FE 132 registers S-CSC-FE information to which a user terminal belongs, in the SAA-FE/SUP-FE 133 using an SAR message (operation 43) and receives a profile and billing information of the service user from the SAA-FE-SUP-FE 133 using an SAA message (operation 44).

The S-CSC-FE/I-CSC-FE 132 sends a service registration success message for an SIP register to the subscriber terminal through the P-CSC-FE 131 (operation 34).

The following Table 1 shows an example in which a subscriber ID, an IP address, a Realm, bundle information between access and service networks, an access authentication scheme, an authentication context, and a line ID are stored in a database of the TAA-FE/TUP-FE 123 of FIG. 1.

TABLE 1

| Subscriber ID | IP Address | Realm | Bundle Information | Access Authentication Scheme | Authentication Context | Line ID |
|---|---|---|---|---|---|---|
| sub1@etri.re.kr | 123.456.789.123 | etri.com | Line-based SCF-NACF | EAP-AKA | RAND‖AUTN‖XRES‖CK‖IK | xDSL line |
| sub1@etri.re.kr | 123.456.789.124 | etri.com | Authentication information-based SCF-NACF | | nonce‖response | |
| sub2@etri.re.kr | 123.456.789.124 | etri.com | Unsubscribed | | RAND‖AUTN‖XRES‖CK‖IK | |
| ... | ... | ... | ... | ... | ... | ... |

According to Table 1, one subscriber ID and authentication-related information are matched in the format of a lookup table.

The following Table 2 shows an example in which PRID, PUID, an IP address, a Realm, bundle information between access and service networks, a service authentication scheme, an authentication context, a line ID, and effective time are stored in a database of P-CSC-FE 131 of FIG. 1.

TABLE 2

| PRID | PUID | IP Address | Realm | Bundle Information | Service Authentication Scheme | Authentication Context | Line ID | Effective Time |
|---|---|---|---|---|---|---|---|---|
| user1@etri.re.kr | sip:user1@etri.re.kr | 123.456.789.123 | etri.com | Line-based SCF-NACF | Line-based SCF-NACF | | xDSL line | 60 |
| user1@etri.re.kr | tel:01123456789 | 123.456.789.124 | etri.com | Authentication information-based SCF-NACF | Authentication Information-based SCF-NACF | RAND‖AUTN‖ XRES‖CK‖IK | | 50 |
| user2@etri.re.kr | sip:user2@etri.re.kr | 123.456.789.124 | etri.com | Unsubscribed | Digest-MD5 | | | |
| ... | ... | ... | ... | ... | ... | ... | ... | ... |

In Table 2, PRID and PUID are keys.

The following Table 3 shows an example in which PRID, PUID, a subscriber ID, an IP address, an Realm, bundle information between access and service scheme, a service authentication method, an authentication context, a line ID, and effective time are stored in a database of S-CSC-FE/I-CSC-FE 132 of FIG. 1.

TABLE 3

| PRID | PUID | Bundle Information | Service Authentication Scheme | Authentication Context | Line ID | Effective Time |
|---|---|---|---|---|---|---|
| user1@etri.re.kr | sip:user1@etri.re.kr | Line-based SCF-NACF | Line-based SCF-NACF | | xDSL line | 60 |
| user1@etri.re.kr | tel:01123456789 | Authentication Information-based SCF-NACF | Authentication Information-based SCF-NACF | RAND∥AUTN∥XRES∥CK∥IK | | 50 |
| user2@etri.re.kr | sip:user2@etri.re.kr | Unsubscribed | Digest-MD5 | | | |
| ... | ... | ... | ... | ... | ... | ... |

The following Table 4 shows an example in which PRID, PUID, a subscriber ID, a Realm, bundle information between access and service networks, a service authentication method, an authentication context, a line ID, and effective time are stored in a database of S-CSC-FE/I-CSC-FE 132 of FIG. 1.

TABLE 4

| PRID | PUID | Subscriber ID | Bundle Information | Service Authentication Scheme | Authentication Context | Line ID | Effective Time |
|---|---|---|---|---|---|---|---|
| user1@etri.re.kr | sip:user1@etri.re.kr | sub1@etri.re.kr | Line-based SCF-NACF | Line-based SCF-NACF | | xDSL line | 60 |
| user1@etri.re.kr | tel:01123456789 | sub1@etri.re.kr | Authentication Information-based SCF-NACF | Authentication Information-based SCF-NACF | RAND∥AUTN∣XRES∥CK∥IK | | 50 |
| user2@etri.re.kr | sip:user2@etri.re.kr | sub2@etri.re.kr | Unsubscribed | Digest-MD5 | | | |
| ... | ... | ... | ... | ... | ... | ... | ... |

The following Table 5 shows an example in which PRID, PUID, a subscriber ID, a Realm, bundle information between access and service networks, an access authentication method, an authentication context, a line ID, and effective time are stored in a database of the bundled authentication management server 14 of FIG. 1.

TABLE 5

| PRID | PUID | Subscriber ID | Bundle Information | Access Authentication Scheme | Authentication Context | Line ID | Effective Time |
|---|---|---|---|---|---|---|---|
| user1@etri.re.kr | sip:user1@etri.re.kr | sub1@etri.re.kr | Line-based SCF-NACF | EAP-AKA | RAND∥AUTN∥XRES∥CK∥IK | XDSL line | 60 |
| user1@etri.re.kr | tel:01123456789 | sub1@etri.re.kr | Authentication Information-based SCF-NACF | EAP-AKA | RAND∥AUTN∥XRES∥CK∥IK | | 50 |
| user2@etri.re.kr | sip:user2@etri.re.kr | sub2@etri.re.kr | Unsubscribed | | | | |
| ... | ... | ... | ... | ... | ... | ... | ... |

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While this invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention

The invention claimed is:

1. A method for bundle authentication in a service call session control functional entity (S-CSC-FE) of an SC entity in a network including an NAC entity and the SC entity, the method comprising:
   receiving an SIP register message to which first authentication information is added;
   transmitting by a processor an authentication request message to an SUP-FE;
   receiving a response message including second authentication information from the SUP-FE; and
   performing authentication by comparing the first authentication information with the second authentication information,
   if the authentication succeeds, transmitting its own information to the SUP-FE, and
   wherein the transmitting of its own information comprises transmitting its own information by using a server assignment request (SAR) message.

2. The method of claim 1, wherein the transmitting of the authentication request message comprises transmitting a multimedia authentication (MMA) request message.

3. The method of claim 1, further comprising, if the authentication succeeds, transmitting a response message to a terminal.

4. A method for bundle authentication in an SUP-FE of an SC entity in a network including an NAC entity and the SC entity, the method comprising:
   receiving an authentication request message from an S-CSC-FE of the SC entity; and
   transmitting by a processor a response message including authentication information to the S-CSC-FE, and
   wherein the SUP-FE of the SC entity in the network, which included the NAC entity and the SC entity, is performed wired or wirelessly,
   if authentication in the S-CSC-FE succeeds, receiving information of the S-CSC-FE from the S-CSC-FE,
   wherein the receiving of the information of the S-CSC-FE comprises receiving information of the S-CSC-FE by using an SAR message.

5. The method of claim 4, further comprising, before the receiving of the authentication request message, receiving subscriber identification information and authentication information from the NAC entity.

6. A method for bundle authentication in a service call session control functional entity (S-CSC-FE) of an SC entity in a network including an NAC entity and the SC entity, the method comprising:
   receiving an SIP register message to which first authentication information is added;
   transmitting by a processor an authentication request message to an SUP-FE;
   receiving a response message including second authentication information from the SUP-FE; and
   performing authentication by comparing the first authentication information with the second authentication information, and
   wherein the S-CSC-FE of the SC entity in the network is performed wired or wirelessly.

* * * * *